June 4, 1946.                    J. MIHALYI                    2,401,700
                                RANGE FINDER
                         Filed Jan. 19, 1943            10 Sheets-Sheet 1
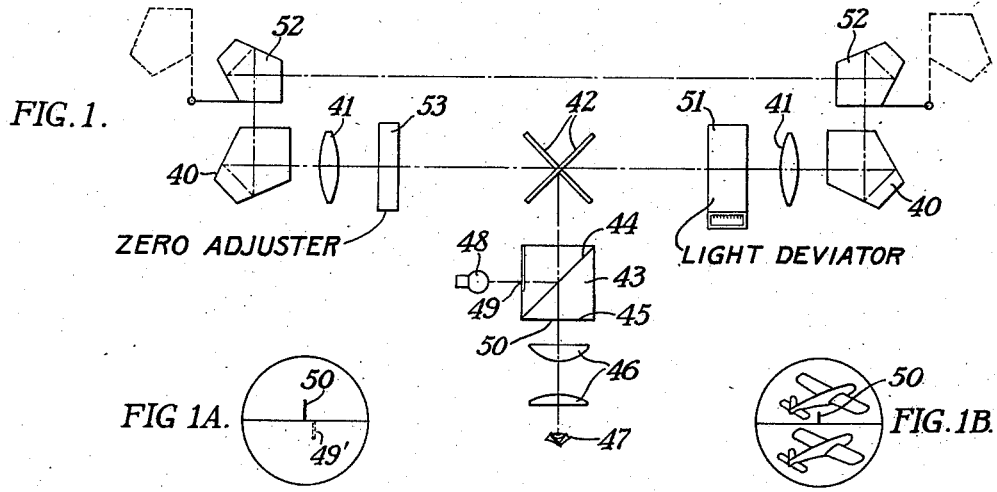
FIG. 1. *PRIOR ART*
FIG. 1A.
FIG. 1B.
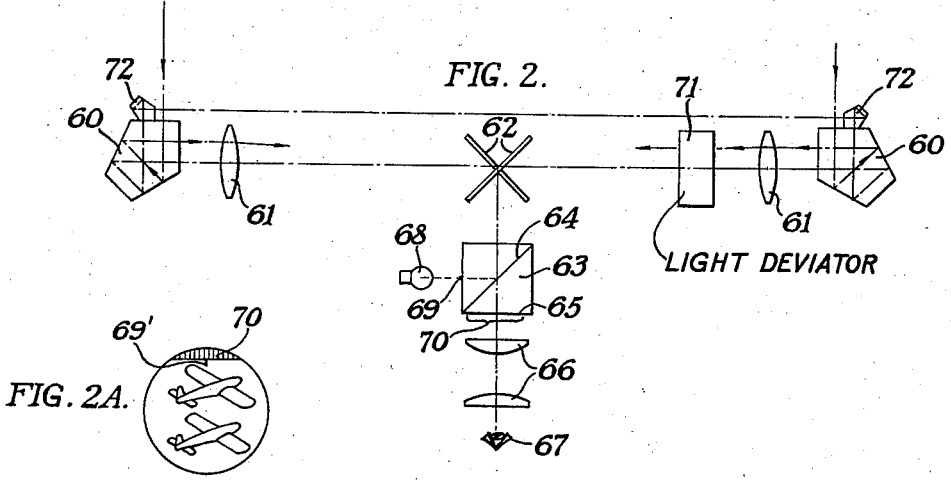
FIG. 2.
FIG. 2A.
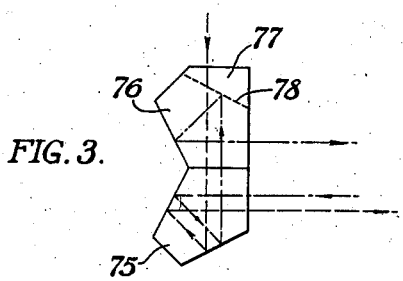
FIG. 3.
JOSEPH MIHALYI
INVENTOR
BY
ATT'Y & AG'T June 4, 1946.                J. MIHALYI                2,401,700
                             RANGE FINDER
                    Filed Jan. 19, 1943        10 Sheets-Sheet 2
FIG. 4.
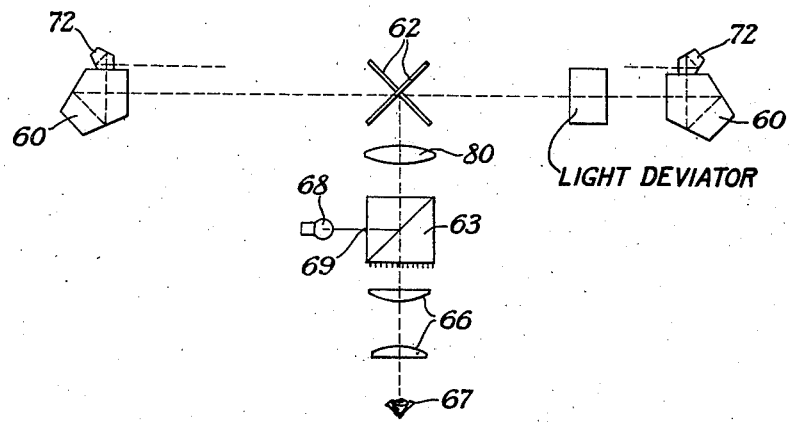
FIG. 5.                FIG. 5A.
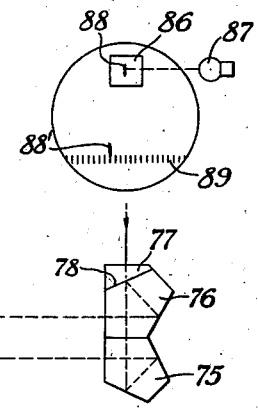
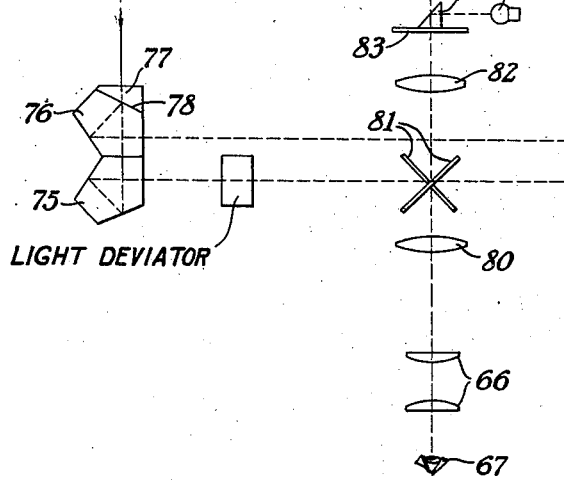
FIG. 5B.
JOSEPH MIHALYI
    INVENTOR
BY
       ATT'Y & AG'T

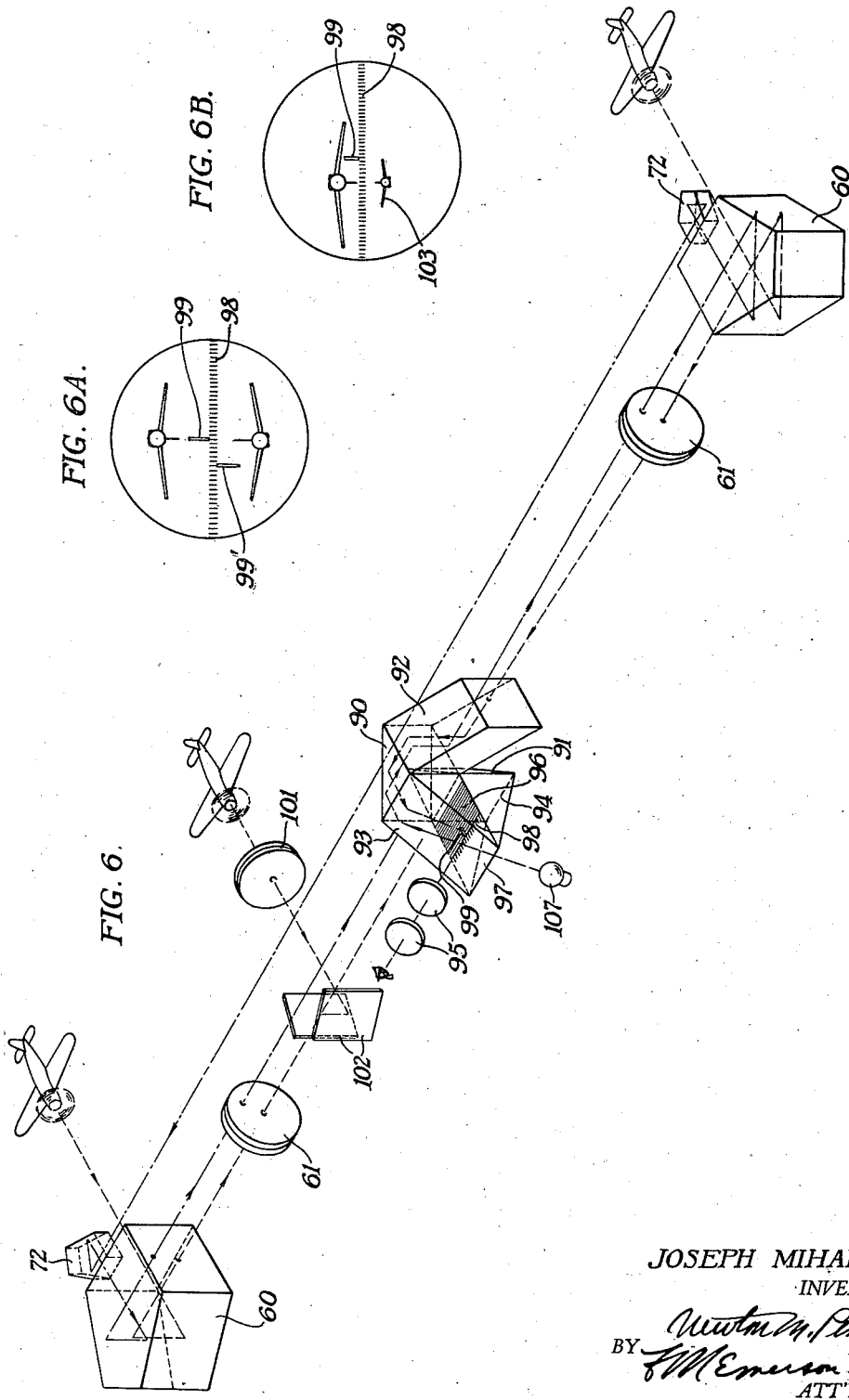

June 4, 1946.  J. MIHALYI  2,401,700
RANGE FINDER
Filed Jan. 19, 1943   10 Sheets-Sheet 4
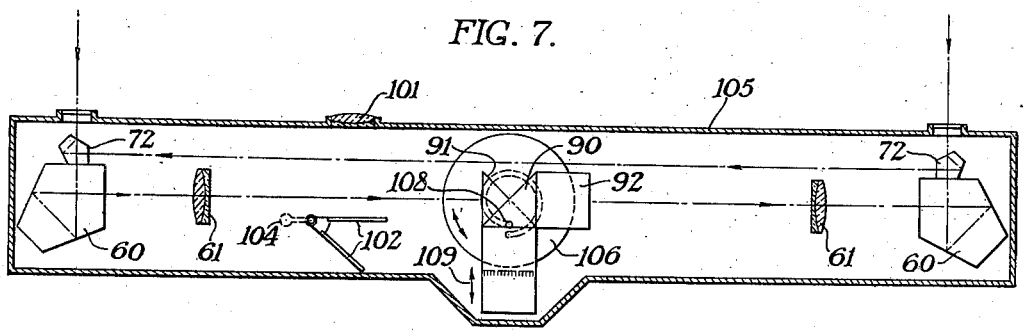
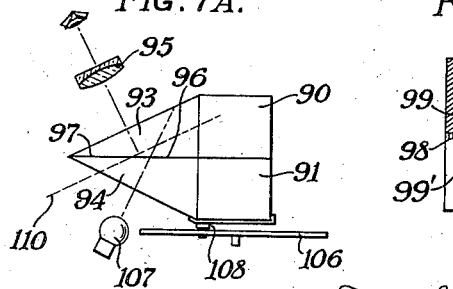
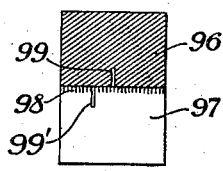
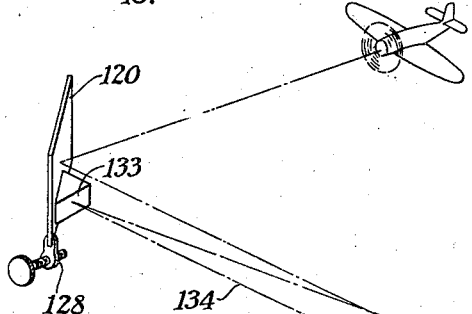
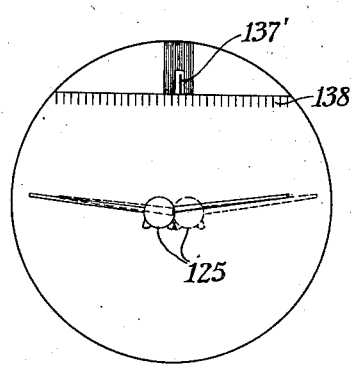
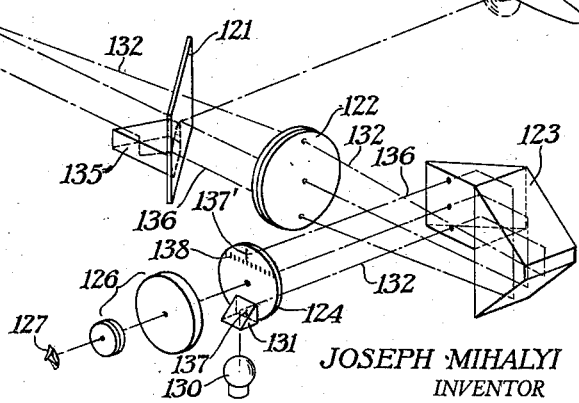
JOSEPH MIHALYI
INVENTOR
BY
ATTY & AG'T June 4, 1946.  J. MIHALYI  2,401,700
RANGE FINDER
Filed Jan. 19, 1943   10 Sheets-Sheet 5

PART 1.

JOSEPH MIHALYI
INVENTOR

BY
ATT'Y & AG'T

June 4, 1946.  J. MIHALYI  2,401,700
RANGE FINDER
Filed Jan. 19, 1943  10 Sheets-Sheet 6
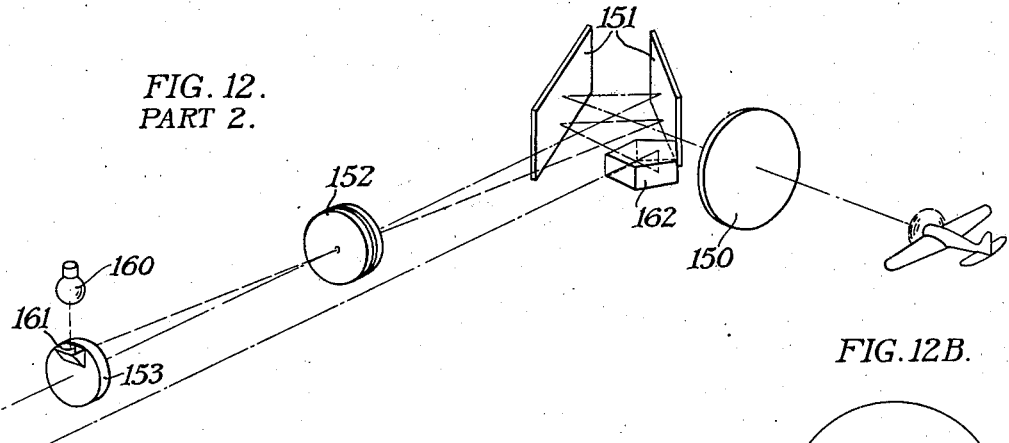
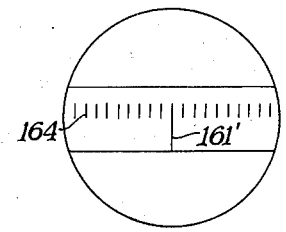
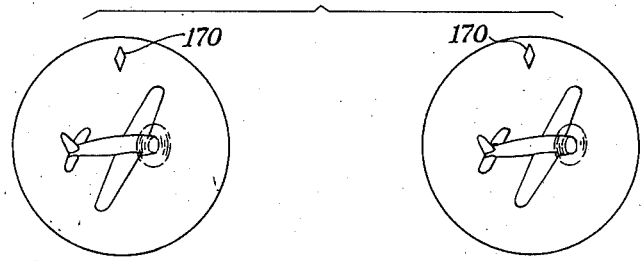
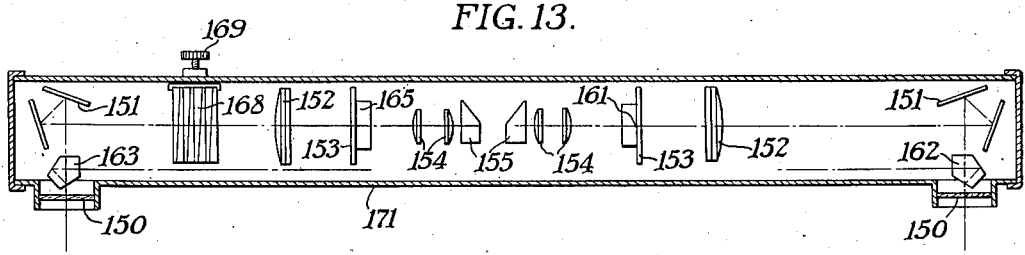
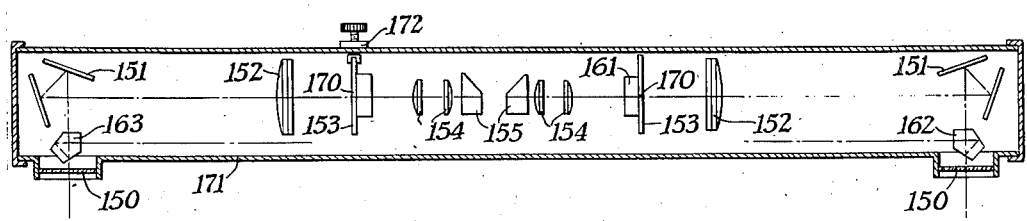
JOSEPH MIHALYI
INVENTOR June 4, 1946. J. MIHALYI 2,401,700
RANGE FINDER
Filed Jan. 19, 1943 10 Sheets-Sheet 7
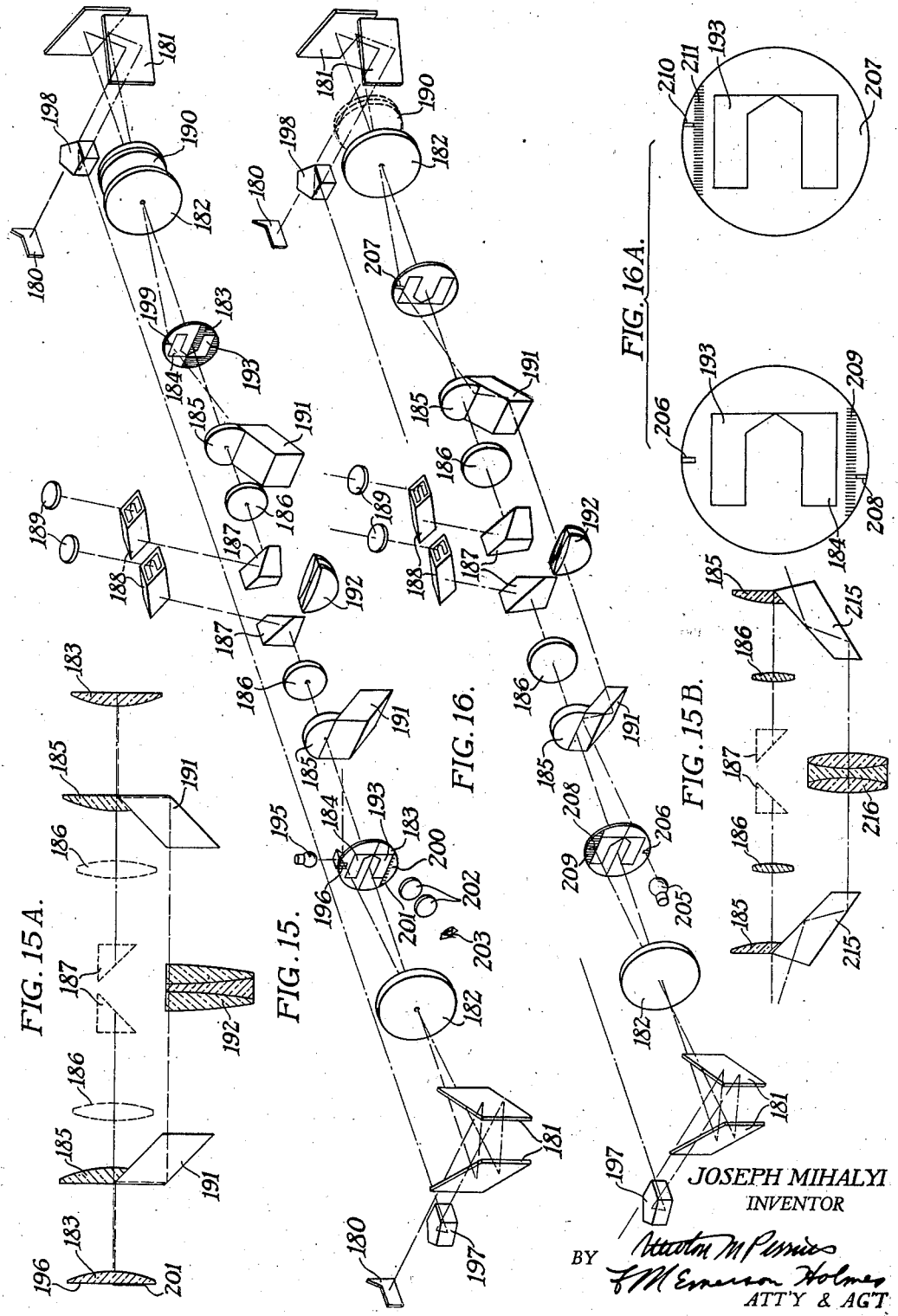
JOSEPH MIHALYI
INVENTOR June 4, 1946.　　　　　J. MIHALYI　　　　　2,401,700
RANGE FINDER
Filed Jan. 19, 1943　　　　10 Sheets-Sheet 8

JOSEPH MIHALYI
INVENTOR

BY
ATT'Y & AG'T

June 4, 1946.　　　　J. MIHALYI　　　　2,401,700
RANGE FINDER
Filed Jan. 19, 1943　　　　10 Sheets-Sheet 9

JOSEPH MIHALYI
INVENTOR

BY *[signatures]*
ATT'Y & AG'T

June 4, 1946. J. MIHALYI 2,401,700
RANGE FINDER
Filed Jan. 19, 1943 10 Sheets-Sheet 10
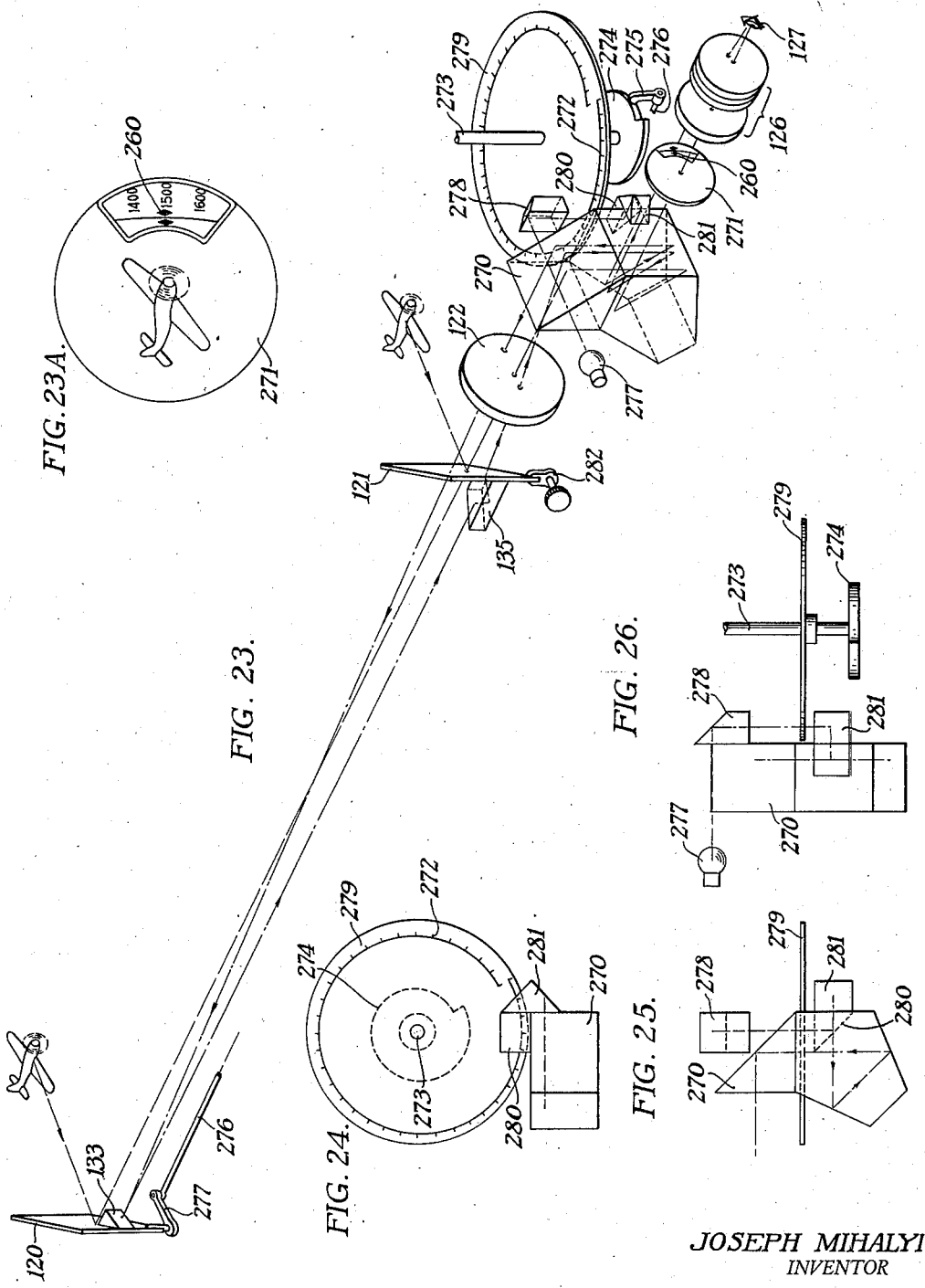
JOSEPH MIHALYI
INVENTOR
BY
ATT'Y & AG'T Patented June 4, 1946

2,401,700

UNITED STATES PATENT OFFICE 2,401,700

RANGE FINDER

Joseph Mihalyi, Rochester, N. Y., assignor to Eastman Kodak Company, Rochester, N. Y., a corporation of New Jersey Application January 19, 1943, Serial No. 472,831

32 Claims. (Cl. 88—2.7)

This invention relates to range finders.

This is Case A of a series of patent applications relating to this same subject, the other cases including the following:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Polarizing beam splitter. | 481,391 | Apr. 1, 1943 | MacNeille. |
| Range finders—Case M | 491,954 | June 23, 1943 | Do. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |

The object of this invention is to eliminate entirely or reduce greatly the errors in existing range finders. The main object of the invention is to compensate for any distortion or deviation of the light paths through the instrument due to such causes as mechanical stresses, strains, unequal thermal expansion and dislocation of parts due to shock received by the housing of the range finder. Although range finders must always remain relatively delicate instruments, the greatest source of errors caused by non-rigidity is eliminated by the present invention.

It is also an object of one form of the invention to provide means for reading the range directly in a field of view of the eyepiece of the finder.

It is an object of one species of the invention to obtain some or all of the above advantages in a coincidence type range finder. One form of coincidence range finder particularly discussed in this case, is the symmetrical type having the comparison field approximately symmetrically located between the viewing points. Another type to which this case is particularly directed involves the application of this invention to coincidence range finders of the type sometimes known as the ortho-pseudo stereo range finder. This Case A is further distinguished from other cases of the series by relating particularly to range indicating elements of the scale and index type wherein an image of the index is projected to the scale, as well as to the broader aspects of the invention.

Since the present invention finds application in practically all types of range finders, a brief outline is now given describing the features which are common to all range finders to which the present invention may be most readily applied. Range finders in general have two spaced viewing points or front windows at which they receive light, which is substantially collimated, from the object being ranged. Simple range finders have been made without any lenses being involved, but the present invention is concerned with a refinement appropriate to and necessary with only the more complicated systems which have at least one objective in both beams or one or more objectives in each beam. The optical system of any range finder on receiving the two beams of light (called the "object beams") directs them by reflectors near one or both of the viewing points to form images in comparison planes which may be separate as in stereo range finders or may be co-planar as in various coincidence type range finders including split field, superimposed fields, etc. A range finder usually involves some form of range adjustor such as a light deviating means which is useful in either stereo or coincidence type range finders or reticle moving means which is useful only in stereo type finders. The broad invention as described in this case is not primarily concerned with the forms which these standard features may take in various range finders. It is noted that in each type part of the optical system of a range finder operates only on one of the object beams and another part of the optical system operates only on the other object beam. There may also be a portion of the system operating on both object beams but this portion is not so critical to the present invention. This point is mentioned because the present invention is specifically concerned with correcting for errors in the independent portions of the optical system as thus defined.

According to the present invention standard range finders are improved by incorporating into them a pair of adjustment coincidant elements such as a scale and index or as specifically described in Case E a fiducial mark and adjustable coincidence line. The scale and index may be simple or have a relatively complex form. Also, according to the invention, means are included for projecting through at least the exact optical equivalent of both of the above described portions of the optical system light from one of the elements into focus forming an image adjacent to the other element or an image thereof. In one form of the invention, described in more detail in a Case H, light is projected from both elements forming images adjacent to one another in a third plane. In every form, however, the image formed by light projected from at least one of the elements is adjacent to the other element or an image thereof. This light beam from one element to the other is referred to as the "element beam" to distinguish it from the object beams.

The ranging adjustor of the range finder also adjusts this element image relative to the adjacent entity whether it is the other element itself or an image of the other element.

In one preferred form of the invention, the elements are in the comparison planes or at least optically in those planes. That is, they may be to one side of the planes but a mirror directing light into the system is positioned so that it forms a virtual image of the elements in the comparison planes. This means that the elements are at least optically in the field of view of the eyepiece, and hence, in this form of the invention it is quite simple to provide means for reading the range directly through the same eyepiece.

Preferably, the adjustment coincidant elements, e. g. the scale and index, are rigidly attached to the means for defining the corresponding comparison planes or are rigidly attached to one another in the case of a coincidence range finder.

In one preferred form of the invention, the index is the element whose image is projected adjacent to the scale and this has the advantage of simplification, but in another form of the invention, described in more detail in a Case F, the scale is the element projected, the index being fixed. In fact, in Case F this latter feature is combined with the fiducial mark and coincidence line form of adjustment coincidant elements to give other advantages.

Additional objectives may be included in preferred forms of the invention for collimating and/or refocusing the light in the element beam. Of course, it is simpler to have the elements at least optically in the comparison planes and to form the image of one adjacent to the other, but from a purely theoretical viewpoint the elements could be slightly out of these planes as long as they are conjugate to one another and the light forming the image of one element adjacent to the other suffers all of the deviations of the range finder system.

The theory of the present invention is that any error introduced in the range finder system which error moves one of the object images relative to the other, similarly displaces the adjustment coincidant element image relative to the other adjustment coincidant element. Therefore, when coincidence (including depth coincidence in a stereo finder) is reached, the adjustment coincidant elements properly adjusted, give the proper range whether the range finder system is in proper adjustment or not. Every part of the range finder optical system which deviates one of the object beams relative to the other should deviate the element beam correspondingly and with equal rates of change of direction so that any effective changes in object beam direction are accompanied by equal changes in element beam direction.

In the symmetrical form of coincidence range finder, two main reflectors, preferably optical squares, such as penta prisms, are positioned one behind each viewing point to reflect the object beams toward the center of the instrument where it is received by crossed reflectors and directed into comparison planes. In any form of range finder, the present invention can, for example, be applied by placing a small, or a large semi-transparent, optical square in front of the viewing point to receive the element beam from the main reflector. These small or semi-transparent reflectors then reflect the element light beam from one viewing point to the other and back into the optical system of the range finder eventually to reach the comparison plane or its optical equivalent adjacent to the other adjustment coincidant element. Some form of auxiliary reflector is usually required to direct this light from one viewing point to the other. If in a coincidence range finder a transparent element is included having a flat surface for defining the comparison planes, it is convenient to have the adjustment coincidant elements on this flat surface or on an equivalent one. When thus arranged in the field of view of the eyepiece, it is preferable to have the elements at the margin of the field so as not to interfere with the object images being brought into coincidence. Some range finders have the comparison plane at an angle to a flat surface of an optical element which surface has a reflecting area divided from a transparent area by the line of intersection with the comparison plane. In such finders, one preferred form of the invention has one of the elements in the form of a transparent marking in the reflecting area, preferably near the dividing line. Light is then sent from behind this reflecting surface through this transparent marking not toward the eyepiece but back toward the ranging system as required to form the element light beam. This system provides a convenience in that the source of light to illuminate the adjustment coincidant element, is on the opposite side of the comparison plane from the eyepiece. For example, when the reflecting plane is formed between two right angle prisms to be viewed through the hypotenuse of one of the prisms, a light source may conveniently be located to send light through the hypotenuse face of the other right angle prism.

The invention is applicable directly to ortho-pseudo stereo range finders since, except for the fact that coincidence is obtained in depth, these may be treated exactly as other coincidence range finders. Of course, the comparison planes are usually separate but since in this case, light travels from one plane to the other, the adjustment coincidant elements may be in the separate planes or preferably both in one plane.

Other advantages and the means for producing them will be fully understood from the following detailed description of the invention when read in connection with the accompanying drawings in which:

Fig. 1 illustrates the closest prior art. Figs. 1A and 1B showing alternative views through the eyepiece respectively when testing and when ranging.

Fig. 2 shows an optical system illustrating the fundamental differences of the invention from the prior art. Fig. 2A is a view through the eyepiece of the instrument shown in Fig. 2.

Fig. 3 shows a prism arrangement alternative to that shown as a detail of Fig. 2.

Fig. 4 illustrates the optical system of an embodiment of the invention alternative to that shown in Fig. 2.

Fig. 5 similarly illustrates still another embodiment of the invention, Figs. 5A and 5B showing the respective views through the two eyepieces of the system.

Fig. 6 is a perspective view of a preferred embodiment of the invention as applied to symmetrical type coincidence range finders, Figs. 6A and 6B showing the respective views through the eyepiece without and with the auxiliary finder system.

Fig. 7 is a plan, partly in section, of the range finder whose optical system is shown in Fig. 6. Fig. 7A shows a vertical section of the coincidence prisms of Fig. 7.

Fig. 8 illustrates in detail the scale and index of the instrument illustrated in Figs. 6 and 7.

Fig. 9 is a perspective view of the optical system of another preferred and simplified embodiment of the invention, Fig. 9A showing the view through the eyepiece of this embodiment.

Figure 10:
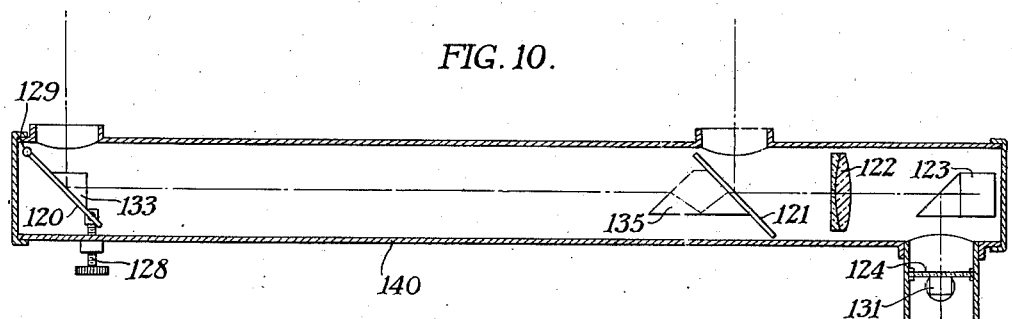

Fig. 10 shows a horizontal section of a range finder having the optical system illustrated in Fig. 9.

Figure 11:
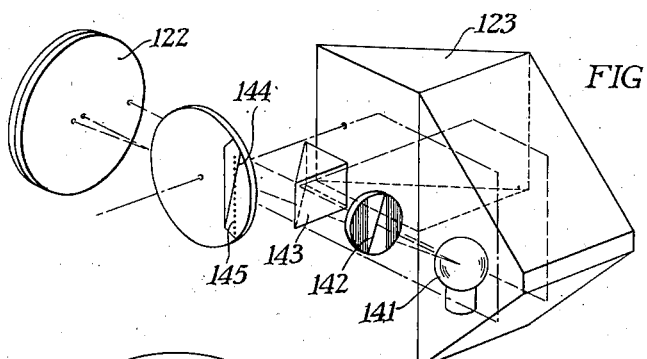
Figure 11A:
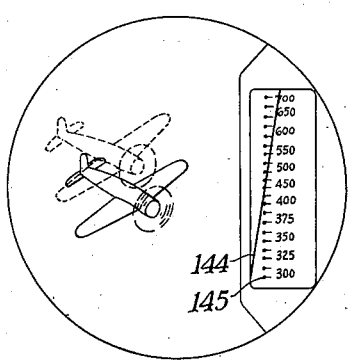

Fig. 11 shows an alternative arrangement of the scale and index of the optical system shown in Fig. 9, Fig. 11A being a view through the eyepiece when this alternative arrangement is used.

Figure 12:
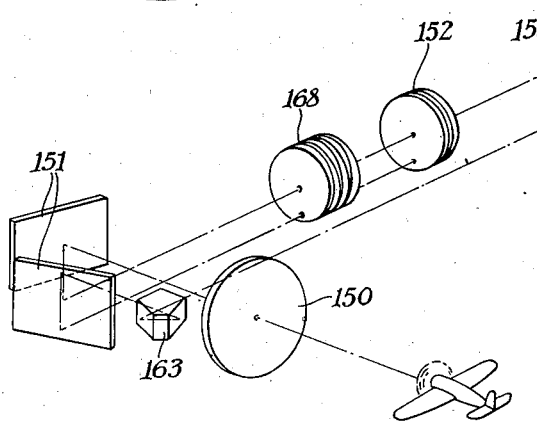

Fig. 12 shows the perspective of the optical system of a stereoscopic range finder incorporating the invention and for clarity is enlarged so that the two parts of the figure appear on different sheets of the drawings. The symmetry of the instrument allows the invention to be fully understood from either part of Fig. 12. Fig. 12A shows the views through the binocular eyepieces of the instrument. Fig. 12B shows the view through the scale reading eyepiece of the instrument.

Fig. 13 is a horizontal section of a range finder incorporating the optical system of Fig. 12.

Fig. 14 shows a similar range finder which differs from Fig. 13 by employing as the ranging adjustor, means for moving one of the reticle marks relative to the other instead of a light deviating device.

Fig. 15 shows the optical system, in perspective, of an ortho-pseudo stereo range finder incorporating the present invention. Fig. 15A is a vertical section of a detail of Fig. 15. Fig. 15B is a similar section of an alternative arrangement.

Fig. 16 differs from Fig. 15 by incorporating the present invention in a manner which permits the scale to be read in at least one of the eyepieces used for observing stereo coincidence. Fig. 16A shows the view through the binocular eyepieces of this range finder.

Figure 17:
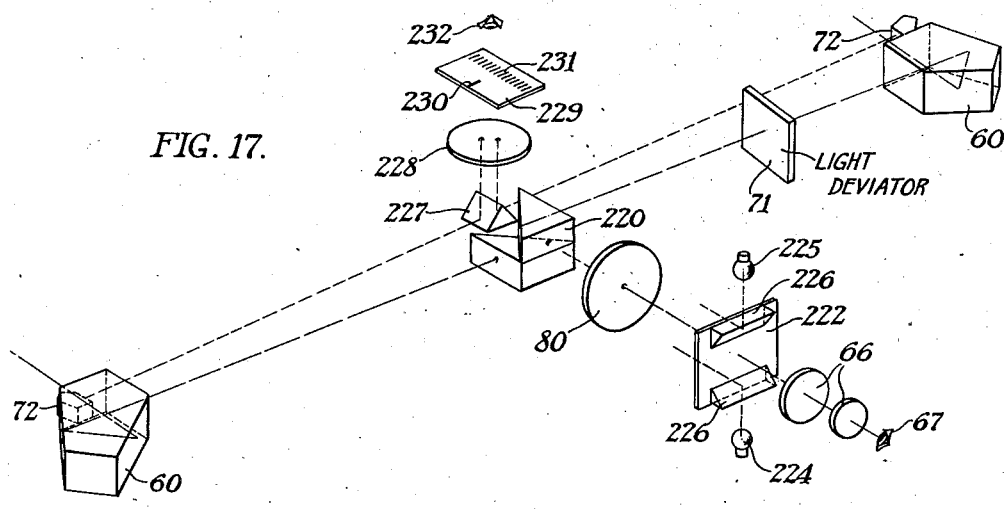

Fig. 17 illustrates in perspective an alternative embodiment of the invention.

Figure 18:
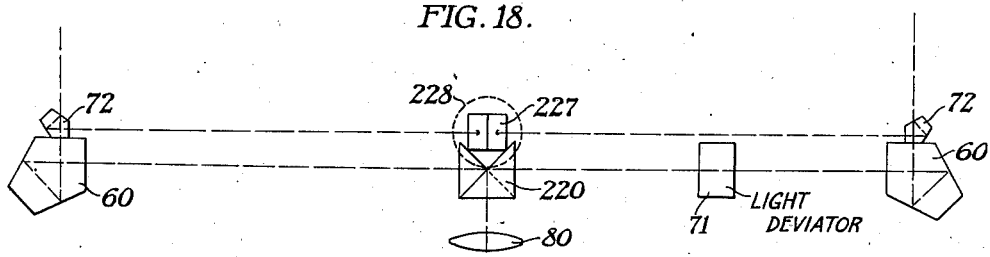

Fig. 18 is a plan view of the arrangement shown in Fig. 17.

Figure 19:
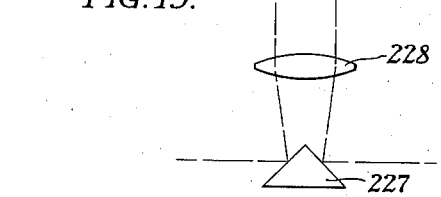

Fig. 19 is a vertical section of a detail of the arrangement shown in Fig. 17.

Figure 20A:
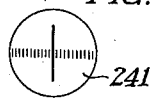
Figures 20, 20B:
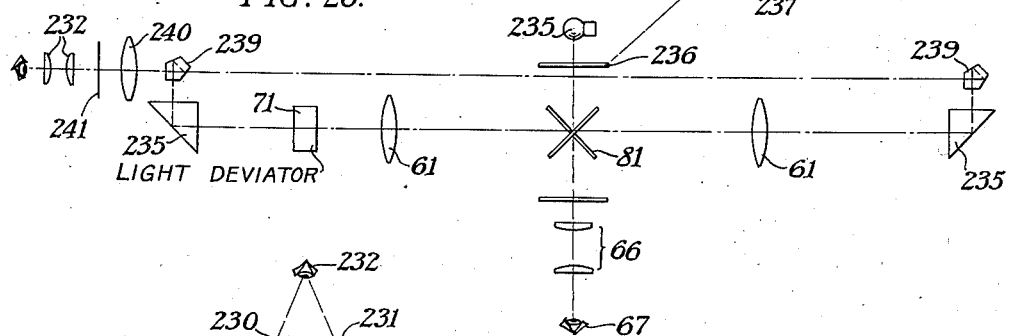

Fig. 20 shows the optical system for another embodiment of the invention, Fig. 20A being a view through the scale reading of the eyepiece of the system. Fig. 20B illustrates a detail of the arrangement shown in Fig. 20.

Figure 21A:
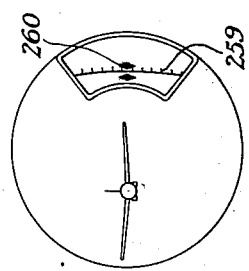
Figure 21:
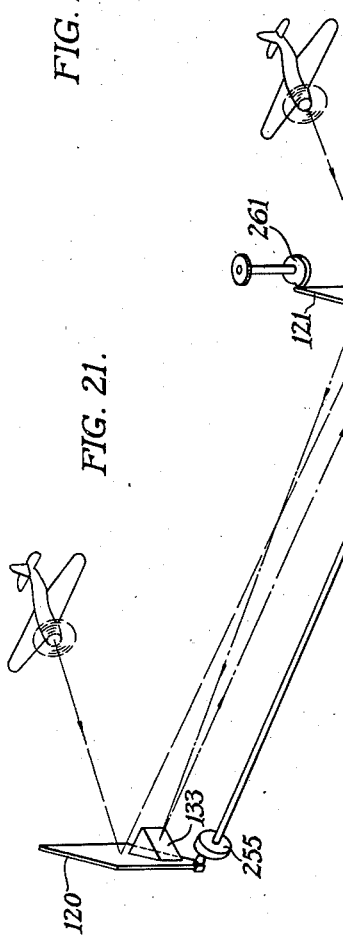

Fig. 21 illustrates in perspective a preferred embodiment of the invention using a fiducial mark and coincidence line according to the present invention combined with an arrangement for permitting the scale and index to be viewed in the eyepiece of the system as illustrated in Fig. 21A.

Figure 22:
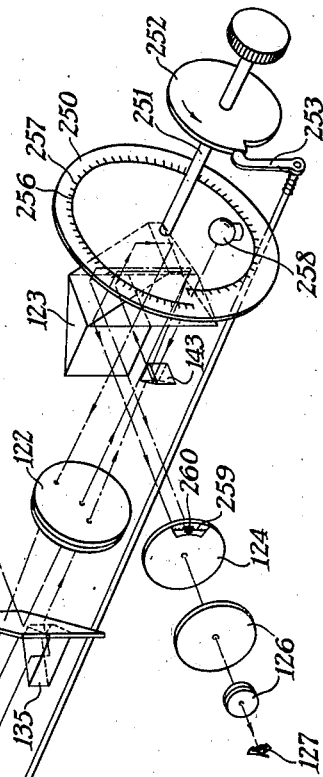

Fig. 22 is a horizontal section of a detail of the arrangement shown in Fig. 21.

Fig. 23 shows a preferred modification of the instrument shown in Fig. 21, Fig. 23A being a view through the eyepiece of the instrument.

Figs. 24, 25, and 26 are respectively horizontal, side and end views of a detail of Fig. 23.

In Fig. 1 is illustrated the optical system of known types of range finders. When ranging a subject, light is received at the two spaced viewpoints and directed by the penta-prisms or optical squares 40 through objectives 41 to crossed mirrors 42 to be brought to focus in comparison planes which in this case are coplanar at the surface 45 of a split prism 43 having a semi-transparent reflector 44 at the diagonal surface thereof. These images are viewed through an eyepiece 46 by the eye 47 of an observer who, when viewing an airplane sees an arrangement such as shown in Fig. 1B or perhaps a full field arrangement whichever is more convenient. These images in the comparison planes are brought into coincidence by a light deviator 51. In case the instrument gets out of adjustment, it may be checked by observations of an artificial infinity. This is provided by turning on a light 48 to illuminate a mark 49 whose image is projected by the semi-reflector 44 into one-half of the range finder system. Since the mark 49 is optically at the same distance from the objectives 41 as the surface 45, this light from the source 48 is collimated by one of the objectives 41 and passes into adjacent penta-prism 40 and out through the front window or viewing point of the instrument. However, when checking the instrument, two auxiliary penta-prisms 52 are swung into place as shown so they reflect the light from one viewing point to the other and back into the range finder. This light thus reflected is brought to focus by the other objective 41 forming an image 49' in the focal plane of the eyepiece 46, i. e. at the surface 45. This surface 45 is provided with a mark 50 which by comparison with the image 49' indicates when the instrument is in proper adjustment. If the instrument is out of adjustment, a zero adjustor 53 is operated to bring the image 49' into coincidence with the mark 50.

Such an arrangement has proven in practice to have several disadvantages. In the first place, it is not possible to use the range finder when checking its zero adjustment. In the second place, the finders often due to a slight bump, get out of adjustment immediately after making a zero correction. In fact, the only safe way to take a range with such an instrument is to correct the zero immediately before ranging and then to check the instrument after ranging, accepting the reading only if the instrument is shown to have remained in proper adjustment. Obviously, such a range finder if it gets out of adjustment easily is practically worthless when attempting to make split-second range readings necessitated by modern warfare. In the third place, the checking of the zero adjustment involves the use of a movable auxiliary optical system which itself may therefore get out of adjustment. Incidentally, it is not convenient to have the range scale in the eyepiece of such an instrument because of the preferable position of the light deviator, such as shown.

According to the invention as shown in Fig. 2, on the other hand, such a range finder may be improved by having the scale and index mounted in the eyepiece field or at least optically in this field. In this arrangement the light from the objective being ranged is received by optical squares 60, is brought to focus by objectives 61 and is directed by crossed mirrors 62 to form images in the focal plane 65 of an eyepiece 66 to permit viewing by the eye 67 of an observer. According to the present invention, a light source 68 illuminates the index 69 so that light therefrom may be reflected by a semi-transparent diagonal surface 64 of a double prism 63 into one portion of the range finder optical system so as to be collimated by one objective 61. Further according to the invention this light is received by a small penta-prism 72 cemented to the front of the large penta-prism 60 and is thence reflected to the other viewpoint of the system to be received by a similar small penta-prism 72 and reflected back into the other portion of the range finder optical system. This collimated light is then brought to focus by the objective 61 forming an image 69' at one margin of the field of the eyepiece 66 as shown in Fig. 2A. A scale 70 is inscribed on the surface 65 in this focal plane against which scale the image 69 indicates the range of the objective being tested. The light from the objective in one of the beams is adjusted by a light deviator 71 to bring the two beams from the external target into coincidence. This light deviator 71 simultaneously and similarly adjusts the element light beam coming from the index 69.

It will be noted that the scale of the light deviator 71 is no longer coupled directly to this element of the instrument in this particular embodiment of the invention. Similarly, there is no zero adjustor corresponding to element 53 of Fig. 1 although some adjustor may be included for other purposes such as field halving. Furthermore, the auxiliary penta-prisms 72 remain in place at all times and are not swung to one side. The advantage of the invention is that no matter what happens in the optical system of the range finder to cause the images of the object being ranged to move relative to one another, the same deviation is introduced into the beam of light forming the image 69 so that the reading is still correct. For example, suppose one of the objectives 61 is knocked slightly sideways causing the object image to be shifted similarly sideways. This moves the image 69 an equal distance to one side. When the instrument is adjusted by the light deviator 71 to bring the two object images into coincidence the image 69, read against the scale 70, gives the correct range automatically compensating for any errors in the optical system.

In Fig. 3, the penta-prisms 60 and 72 are replaced by a penta-prism 75, the same size as the penta-prism 60 cemented to an equal size penta-prism 76 having a third prism 77 cemented to the front surface thereof with a semi-transparent, semi-reflecting surface 78 therebetween. This permits the light from the object to pass unhindered through the prism 77 and 76 into the prism 75, except for the diminution of intensity by the surface 78. Light from the index 69, however, passing from the prism 75 into the prism 76 is partly reflected by the surface 78 to operate in the same manner as in Fig. 2.

Fig. 4 differs from Fig. 2 by using a single more powerful objective 80 in place of the two objectives 61, which has certain advantages and certain disadvantages. This figure is included to illustrate the fact that the light from the index 69 passes through the portion of the optical system which forms one of the object images or the exact optical equivalent thereof and then after being reflected from the vicinity of one range finder viewing point to the other, passes through the other portion of the optical system used for forming the other object image in the comparison fields. It will be noted that the portion of the optical system between the crossed mirrors 62 and the focal plane of the eyepiece 66 is common to both image forming portions of the range finder system. Theoretically the element beam need traverse only the portions of the optical system which are not common to the two beams.

In Fig. 5, which incidentally uses the alternative penta-prism arrangement of Fig. 3, the index and scale part of the system is quite independent of the comparison field half of the system. The crossed mirrors 81 in this case are reflecting from either side so that in one case they send light from the object being ranged through the objective 80 to form images as seen in Fig. 5B. In this arrangement, an auxiliary objective 82 is provided on the side of the crossed mirrors 81 opposite to the objective 80. Such arrangements are discussed in more detail in Case D of this series. Light from a source 87 is reflected by a totally reflecting prism 86 to illuminate an index 88 engraved on a plate 83 placed at the focal plane of the objective 82. Light from this index 88 which may be either a black mark on a transparent ground or a transparent mark on a dark ground is collimated by the objective 82 and the collimated light is reflected by the back of one of the crossed mirrors 81 into the range finder optical system heading toward one of the penta-prisms 75. This collimated light after the round trip from one range finder viewing point to the other is reflected by the other of the crossed mirrors 81 back through the objective 82 and is brought to focus forming an image 88' in the plane 83 which may be read against a scale 89 by means of an eyepiece 84, and the eye 85 of a second observer. In this case, the instrument is a two-man range finder. Since anything between the eye 67 and the cross mirrors 81 which affects one of the object images as seen in Fig. 5B similarly affects the other object image the present invention does not absolutely require that the adjustment coindicant element beam traverse this part of the range finder system. The same is true of anything which affects the deflection of the light passing from the index 88 to the mirrors 81 since the effect would be counteracted by the corresponding effect on the reading beam forming the image 88'. At this point, it is noted that the objectives 80 and 82 need not have the same power. The important point is that the light forming the image of the adjustment coindicant element, in this case the index, must traverse all of the portions of the range finder optical system which operate only on one of the beams. Anything which happens to either of the object beams up to the time at which they are together entering the objective 80 could introduce an error. However, the effect would be exactly the same on the light from the index 88. For example, if one of the mirrors 81 is rotated slightly about a vertical axis due to some accidental shock received by the instrument, the corresponding part of the object image as seen in Fig. 5B is shifted to one side. Simultaneously the image 88' is moved along the scale 89 as seen in Fig. 5A. When this deflection, which in an ordinary instrument would cause an error in the reading is automatically corrected by moving the light deviator to bring the images in Fig. 5B back into coincidence, the index 88' on the scale 89 is brought back to the point at which the correct reading is given.

Figs. 6, 7, 7A and 8 illustrate a symmetrical type range finder incorporating the invention as well as an auxiliary finder system more fully described in Case G. In this arrangement, the penta-prisms 60 and 72 as well as the objective 61 correspond to those of Fig. 2. The crossed mirrors are replaced by crossed prisms 90 and 91 mounted one above the other. So that the light reaching the prism 90 from corresponding objective 61 will be symmetrical to that reaching the prism 91, an auxiliary rhomb 92 is cemented to the prism 90 to shift the entrant beam upward. The light reflected from these two prisms 90 and 91 enters two right angle prisms which in the embodiment shown happen to be 30—60—90 prisms 93 and 94. These two prisms are cemented together and to the prisms 90 and 91; the light from the crossed prisms 90 and 91 is reflected at the hypotenuse of the prisms 93 and 94 toward the horizontal contained surface part 96 of which is reflecting and part 97 of which is transparent. The line between surface parts 96 and 97 lies in the coplanar comparison planes (110 shown in Fig. 7A) of the range finder and is viewed through the hypotenuse surface of the prism 93 by means of an eyepiece 95. Light from the prism 90 as reflected by the hypotenuse surface of the prism 93 is reflected again and through the eyepiece 95 by the reflecting portion 96 of the comparison field. Light from the prism 91 on the other hand as reflected by the hypotenuse surface of the prism 94 passes to the eyepiece through the transparent area 97. According to a preferred embodiment of the invention, an index 99 consisting of a transparent mark in the reflecting portion 96 of the comparison field is illuminated by a light source 107. Light from this index 99 passes up through the prism, is reflected into the prism 90 and by the prism 92 is directed through the objective 61 and prisms 60 and 72 going from one viewing point to the other as a collimated beam and back through the other objective 61 to the prisms 91 and 94 to form an image 99' adjacent to a scale 98 marked on the transparent portion 97 of the comparison field. Although an index anywhere on the area 96 would give an image in focus on the area 97, the index and image are in best focus in the eyepiece when near the dividing line as shown so as to be practically in the eyepiece focal plane 110.

As the images are adjusted relative to one another to bring them into coincidence, for example, by moving the center prism unit horizontally and transversely with respect to the base of the range finder, the image 99' moves along the scale 98.

These Figs. 6 and 7 incidentally illustrate the auxiliary view finder system of Case G as applied to a symmetrical type range finder. A lens 101 is provided which is of shorter focal length than the objectives 61 so that light from the object being ranged passing through the lens 101 and reflected by removable mirrors 102 to the comparison plane forms a reduced image 103 as shown in Fig. 6B. Of course, the lens 101 is optically nearer the comparison plane than the objectives 61. As best seen in Fig. 7 the mirrors 102 are pivoted at the point 104 so that they may be swung into or out of range finder beam. In practice, one holds the mirrors in the beam just long enough to bring the object to be ranged into the field of view at which time it is seen as a small image 103 by itself or with a larger pair of images showing at least partly due to the objectives 61. The mirrors 102 are then moved out of the optical system so that no light through the lens 101 reaches the comparison plane and the range finder is used in its normal way.

Fig. 7 shows the housing 105 in addition to the optical system discussed in connection with Fig. 6, and Figs. 7 and 7A illustrate the convenient method employed for moving the prism unit including prisms 90 and 91 transversely to give relative movement of the object images. Rotatable disk 106 is provided with a cam or spiral slot engaging a cam follower 108 so that rotation of the disk 106 causes prism unit carried by the cam follower 108 to move transversely as indicated by the double-headed arrow 109.

In Figs. 9 and 10 light from the object being ranged through the two viewing points is reflected by a mirror 120 and a semi-transparent mirror 121 through an objective 122 and an erecting prism 123 to form images 125 as seen in Fig. 9 in a comparison plane defined by a transparent member 124. These images may be viewed by the eye 127 of an observer through an eyepiece 126. To adjust one of the images transversely to bring it into coincidence with the other the mirror 120 is mounted to rotate about a vertical axis at a pivot point 129. This movement is provided by any suitable means such as a nut and driving screw 128. According to the invention, an index 137 engraved on the disk 124 is illuminated by light 130 and a reflecting prism 131. Light from this index as shown by the light ray 132 passes through the erecting prism 123 and objective 122 to become collimated and pass to a reflecting surface 133 mounted rigidly on the mirror 120. This light is then reflected as shown by the ray 134 through a dove prism 135 rigidly attached to the mirror 121 and then as shown by the ray 136 enters the objective 122 to be brought to focus forming an image 137' adjacent to a scale 138 engraved on the disk 124. Of course, any movement of the objective 122 affects both object images in the same manner and does not introduce any error. Any movement of the mirror 120 whether due to the adjusting screw 128 or to some external cause is accompanied by a similar movement of the reflecting surface 133. Similarly, any movement of the mirror 121 is accompanied by an equivalent movement of the dove prism 135. Therefore, anything which affects the relative position of the two images 125 as seen in the field of view affects in exactly the same way the image 137' relative to the scale 138. When the two images 125 are brought into exact coincidence the scale and index give the correct range independent of the adjustment of the various parts of the system. The dove prism 135 may be arranged to intercept the returning beam 134 as shown or to intercept the outgoing portion 132 of the element beam, the scale 138 being calibrated accordingly. Fig. 10 shows this same optical system together with its housing 140 having front windows therein to constitute the viewing points of the range finder.

Figs. 11 and 11A differ from Figs. 9 and 9A by the use of an oblique scale and index. In this case an oblique index 142 is illuminated by a light source 140 and light therefrom is reflected by a total reflecting prism 143 into the erecting prism 123. This light travels through the optical system as in Fig. 9 and ends as an image 144 of the index 142 lying at an acute angle to the scale 145 which consists of a series of dots. Slight lateral movement of the index image 144 gives a relatively large movement of the point of intersection with the scale 145 which results in greater sensitivity and ease of reading. In this Fig. 11 the index 142, prism 143 and focal plane carrying the scale 145 are all shown for clarity as separated from the erecting prism 123. It is often convenient, as described in Case B, to have the index 142 and the scale 145 engraved right on the surface of the prism 123 and to have the light from the lamp 141 pass through the reflecting prism 143 before it illuminates the index 142. Of course, this permits the eyepiece 126 to be much closer to the erecting prism 123 whose surface constitutes the comparison planes.

In Figs. 12, 12A, 12B and 13, a stereoscopic range finder is shown having front windws 150 through which light is received from the object being ranged and is then reflected by optical squares consisting of mirrors 151 through objectives 152 into focus in comparison planes 153 which are quite independent of each other in this stereo finder. By means of relay lenses 154, erecting prisms 155 and rotatable rhombs 156 to permit different interocular separation of the eyepieces 157, images are formed in the focal planes of the eyepieces 157 to be viewed by the right and left eyes 158 of an observer. The image planes 153 are provided with reticle marks 170 as best seen in Fig. 12A and due to stereoscopic fusion these reticle marks appear to be at some fixed distance from the observer. Lateral movement of one of the object images in its image plane 153 without a corresponding movement of the other object image causes the object to appear at a different distance. Such lateral movement is provided by a light deviating device 168 which is adjusted until the object appears to be at the same distance as the reticle marks 170. In an ordinary stereo range finder, the deviation might be indicated in terms of range on a scale mounted on the means 169 for adjusting the light deviator 168.

However, according to the invention an index 161 is provided in one of the comparison planes 153 to be illuminated by a light source 160. Light from this index is collimated by the adjacent objective 152 and is reflected by the mirrors 151 into a penta-prism 162 which in turn reflects it to another penta-prism 163 near the other window and thence back into the optical system through the light deviator 163 and the objective 152 to form an image 161' as shown in Fig. 12B adjacent to a scale 164 engraved on the other comparison plane 153. This scale and index image is viewed by means of a reflecting prism 165 and an eyepiece 166 by a second observer whose eye is shown at 167 and whose field of view is shown in Fig. 12B. It will be noted that the light from the index 161 to form the image 161' passes through the two portions of the optical system which independently form the images in the comparison planes and also by means of penta-prisms 162 and 163, from one viewing point to the other. Fig. 13 shows the housing 171 for the instrument, in which housing the two front windows 150 are mounted.

In Fig. 14 the light deviator 168 is eliminated and this is replaced by means 172 for moving one of the reticle marks 170 laterally so that the apparent distance of the mark is made to change to match that of the object. This movement is accompanied by a similar movement of the scale 164 cemented to the disk 153 carrying the reticle mark 170, and hence, the range may be read directly. As before, since the light forming the index traverses the whole of the pertinent optical system, it corrects for errors occurring in this system. It will be noted in every case, the image of one of the adjustment coincidant elements is by the present invention brought adjacent to the other adjustment coincidant element or as discussed above adjacent to the image thereof.

Fig. 15 shows an ortho-pseudo stereo range finder which for many purposes may be considered a coincidence range finder in which the coincidence is match in depth. Light from the object being ranged, which in this case is indicated by odd shaped blocks 180, enters the viewing points of the range finder and is reflected by mirrors 181 through objectives 182 to form inverted images 184 in the comparison planes of the system. The little blocks 180 are, of course, only representative of the beam of light coming from the real object being ranged, which is at a great distance. By means of rhombs 191 and the half lens 192, light from the images 184 passes at least partially to form erect images 193 immediately below the images 184. That is, an erect right viewing point image is formed below an inverted left viewing point image and vice versa. Both of these images are then viewed by relay lenses 185 and 186, erecting prisms 187, eyepiece prisms 188, and eyepieces 189. Adjustment of the light deviator 190 causes the right viewing point images to move laterally with respect to the left viewing point images so that the inverted fused image seen in the eyepiece appears to move axially away or toward the observer at the same time as the erect fused image appears to move in the opposite direction. This gives the well-known and spectacular effect of the ortho-pseudo range finder. The coincidence is judged when the erect and inverted images appear to be at the same distance from the observer. As shown in Fig. 15A the comparison planes are provided with field lenses 185 and the lower half of each comparison plane is reflecting so that the erect images may be viewed in the eyepieces of the system.

According to the invention, an index 196 illuminated by a light 195 is mounted in one of the comparison planes and light therefrom collimated by one of the objectives 182 is reflected by mirrors 181, penta-prism 197, penta-prism 198 and the other mirrors 181 through the light deviator 190 and the other objective 182 forming an image 199 adjacent to the inverted image 184. This image 199 by means of rhombs 191 and lens 192 is refocused as an image 200 adjacent to a scale 201 below the reflecting part of the adjacent comparison plane. By means of an eyepiece 202 a second observer whose eye is shown at 203 may read the range from this scale.

Fig. 15B shows an alternative arrangement in which the rhombs 191 are replaced by rhombs whose sides are not parallel but which receive the light at a slight angle and pass it through the center of a lens 216 (rather than through the margin of the lens 192 of Fig. 15A). The arrangement shown in 15B has certain advantages, but has the disadvantage of introducing slight keystone distortion to the erect images 193.

Figs. 16 and 16A show an alternative arrangement wherein the scale is visible in the binocular eyepieces of the range finder adjacent to the object images. In these figures the reflecting portion of one of the comparison fields is provided with a transparent index 206 illuminated by a light 205 and light therefrom passes through the other comparison field at the point 207 without any apparent image being seen therefrom and through the objective 182, the mirrors 181 to the penta-prism 198, and thence to the other penta-prism 197 and back into the optical system of the finder to form an image 208 adjacent to a scale 209 engraved on the same comparison plane field lens as the index 206. This scale 209 and image 208 are visible in the left eyepiece, as shown in Fig. 16A, at the bottom thereof below the image 184 which due to the erecting prisms and eyepieces, etc., appears to be upright in this left eye field. Of course, images 210 and 211 of this image 208 and scale 209 are visible in the right eye field since they are formed by the lens 192.

Fig. 17 differs from Fig. 4 mainly by having both adjustment coincidant elements illuminated and light therefrom projected through the range finder optical system to form images adjacent to one another in a third plane. As before the image of one of the elements falls adjacent to at least an image of the other element. The index and scale are engraved on a plate 222 in the comparison field and are illuminated by lamps 224 and 225 whose light is directed by reflecting prisms 226 past the adjacent element to the lens 80 whereat it is collimated. These collimated beams are then reflected by the crossed prisms 220 to the penta-prisms 60 and 72 and back to reflecting surfaces 227 as best seen in Fig. 19 and thence upward through a lens 228 to be brought to focus adjacent to one another in the plane 229 forming images 230 and 231 giving the range to be observed by eye 232 of an auxiliary observer. Anything which affects the two images in the comparison plane 222 equally affects one or other of the light beams from the elements engraved thereon so that the displacement of the images 230 and 231 relative to each other compensates for any errors in the system.

Fig. 20 shows a corresponding modification of Fig. 5 in which a scale 238 and index 237 (see Fig. 20B) are engraved on a plate 236 positioned at the optical equivalent of the focal plane of the eyepiece 66. These adjustment coincidant elements 237 and 238 are illuminated by a lamp 235 and light from the elements reflected by the backs of the cross mirrors 81 is collimated by the objectives 61 and then reflected by prisms 235 at which light from the object being ranged is received in the usual way. These two beams of light are then reflected forward to the penta-prisms 239 which reflect them parallel to each other through an objective 240 into focus superimposed, as seen in Fig. 20A, on an image plane 241 to be viewed by an eyepiece 232. It will be noted that the scale and index are rigid to one another on the member 236 which is in the optical equivalent of the focal plane of the eyepiece 66 and that light from the two beams traverses all of both portions of the range finder system which portions operate independently on the two beams from the object being ranged or at least the optical equivalent of these two portions since the light is reflected from the back of the mirrors 81 instead of from the front.

In Figs. 21, 21A and 22 is shown an arrangement alternative to that shown in Fig. 9, which alternative arrangement has a fiducial mark and coincidence line as the adjustment coincidant elements rather than a scale and index. The simpler forms of this are described in Case E and this more complicated form as shown in Fig. 21 is described in Case F. In this Fig. 21, there is a combination of the advantages of a fiducial mark and coincidence line with a scale also visible through the system. It will be noted in this case that the scale and not the index is the element projected and that the coincidence line is the important element which is projected, the fact that the scale is visible being only incidental. This arrangement in Fig. 21 differs from that in Fig. 9 by having the mirror 120 adjusted by a cam 255 which is rotated on a bar 254 by a cam follower 253 riding on a cam 252 rotated by the ranging knob. This knob simultaneously through a bar 251 rotates a coincidence line 256 consisting of a spiral on a disk 250 which coincidence line is illuminated by a light 258 and is projected through the erecting prism 123 and objective 122 to be reflected at the surface 133 and the dove prism 135 to form an image 259 between two fiducial marks 260 appearing in the margin of the comparison plane 124.

In the simplest form of fiducial mark and coincidence line the instrument would be adjusted perhaps as in Fig. 9 by screw 128 and then the disk 250 carrying the coincidence line 256 would be rotated until its image 259 fell between the fiducial mark 260 at which time the range could be read from any convenient scale mounted on the disk 250. The reading would be by some second observer. However, by the arrangement shown in Fig. 21, the adjustment of the mirror 120 rotates the spiral 256 to keep it in proper adjustment at all times. As long as the instrument is in proper adjustment the scale 257 adjacent to the index line 256 may be read as shown in Fig. 21A by any index, the fiducial marks 260 serving this purpose as well as any other. If anything should happen to the instrument to get out of adjustment the coincidence line image 259 will no longer appear between the fiducial marks 260 and there will not be automatic correction of the reading because the spiral is elongated so that this transverse movement is not along the scale. Of course, one could take hold of the disk 250 and rotate it independently of the adjustment of the mirror 120 and bring the right part of the coincidence line between the fiducial marks 260 at which time the reading would be correct, but it is more convenient to adjust the mirror 121 as by a cam 261 to bring the coincidence line 259 back between the marks 260 so that they do give the correct reading. Thus, as long as the instrument is in proper adjustment the coincidence line 289 appears between the fiducial marks 260 and the scale gives the correct reading. If the instrument gets out of adjustment it is immediately apparent to the observer since the line 259 is no longer between the fiducial marks 260 and he adjusts the cam 261 to bring the line back to its proper position. He then may take a reading directly by adjusting the range knob since after the instrument has been brought into proper adjustment it will stay in adjustment while he makes a reading or will indicate the movement if it gets out of adjustment.

Figs. 23 to 26 are very similar to Fig. 21 but have somewhat different arrangement of the various parts. The mirror 120 is adjusted by a lever 277 through a connecting rod 276 which is operated by a cam follower 275 riding on a horizontal cam 274 which may be turned by a shaft 273 connected to the range knob not shown. The disk 279 also rotated by this shaft 273 carries a spiral and scale 272 which is illuminated by a light 277 through a prism 278. This light passes downward through the disk 279 to a prism 280 whence it is reflected by a Porro prism 281 and an erecting prism 279 and thence through the optical system as before, coming to focus in a comparison plane 271 forming an image adjacent to fiducial marks 269 as best seen in Fig. 23A. This comparison plane 271 is viewed by an eye 127 and eyepiece 126 as before. In Fig. 23 the mirror 127 is adjusted by a nut and driving screw 282 instead of by a cam. Otherwise this Fig. 23 is similar to Fig. 21 but the more complex optical system as best illustrated in Figs. 24, 25, and 26 is introduced to give an instrument much more convenient to use.

Having thus described various preferred embodiments of my invention, I wish to point out that it is not limited to these specific structures but is of the scope of the appended claims.

What I claim and desire to secure of Letters Patents of the United States is:

1. A range finder of the type having two spaced viewing points at which substantially collimated beams of light are received from the object being ranged, an optical system including reflectors at each viewing point and at least one objective for directing and focusing the object beams to form images in comparison planes and a ranging adjuster, characterized by a secondary reflector permanently located at a point substantially in the object beam at each viewing point, for reflecting light from one viewing point to the other, a pair of adjustment coincidant elements and means including the secondary reflectors, for projecting while ranging, a light beam from one of the elements through at least the optical equivalent of said optical system for forming images and from one viewing point to the other to form an image of said one of the elements adjacent to at least an image of the other element.

2. A range finder of the type having two spaced viewing points at which substantially collimated beams of light are received from the object being ranged, the optical system including at least one objective, for directing and focusing the two collimated object beams forming images in comparison planes, one portion of the optical system operating only on one of the beams and another portion operating only on the other beam and a ranging adjuster, said range finder being characterized by a secondary reflector permanently located at a point substantially in the object beam at each veiwing point for reflecting light from one viewing point to the other, a pair of adjustment coincidant elements and means for projecting while ranging and through at least the exact optical equivalent of both of said portions, a light beam from at least one of the elements into focus forming an image of said one element adjacent to at least an image of the other element.

3. A range finder of the type having two spaced viewing points at which substantially collimated beams of light are reecived from the object being ranged, an optical system including at least one objective, for directing and focusing the two collimated object beams forming images in comparison planes, one portion of the optical system operating only on one of the beams and another portion operating only on the other beam and a ranging adjuster, said range finder being characterized by a scale and an index constituting a pair of adjustment coincidant elements and means for projecting through at least the exact optical equivalent of both of said portions and while ranging, a light beam from at least one of the elements into focus forming an image of said one element adjacent to at least an image of the other element, said ranging adjuster also adjusting said one element image relative to the adjacent entity to indicate the range.

4. A range finder according to claim 3 in which said elements are rigidly attached to one another.

5. A range finder according to claim 3 in which said elements are at least optically in the corresponding comparison planes.

6. A range finder according to claim 3 in which means are included for defining the comparison planes, said elements are at least optically in the corresponding comparison planes and are rigidly attached to the corresponding plane defining means.

7. A range finder according to claim 3 in which said elements are in the corresponding comparison planes.

8. A range finder according to claim 3 in which said projecting means projects said one element image adjacent to the other element itself.

9. A range finder according to claim 3 in which an eyepiece is included for viewing the comparison planes and at least images of said scale and index are visible through said eyepiece.

10. A range finder according to claim 3 in which said projecting means includes an objective other than those in said optical system, for collimating the light from said one of the elements.

11. A range finder according to claim 3 in which every part of the optical system which deviates one of the object beams relative to the other also deviates the element light beam correspondingly and with equal rates of change in beam direction.

12. A range finder according to claim 3 in which said projecting means includes a small optical square permanently located at points near each viewing point oriented to reflect light from the adjacent system portion toward the other square while ranging.

13. A range finder according to claim 3 in which said projecting means includes a semitransparent reflector permanently located at points near each viewing point oriented to reflect light from the adjacent system portion toward the other reflector while ranging.

14. A range finder according to claim 3 in which said optical system includes a main reflector at each viewing point and said projecting means includes an auxiliary reflector attached to each main reflector, each auxiliary reflector being oriented to reflect light from the adjacent main reflector toward the other auxiliary reflector.

15. A range finder according to claim 3 and of the coincidence type in which said comparison planes are coplanar, the ranging adjuster is a light deviating device and ranging is done by adjusting the object images into register.

16. A coincidence range finder of the type having two spaced viewing points at which substantially collimated beams of light are received from the object being ranged, an optical system for aligning the two object light beams, for directing them toward a comparison plane and for deviating one beam relative to the other, said range finder being characterized by secondary reflectors respectively and permanently located at points substantially in the object beams at each viewing point for reflecting light from one viewing point to the other, a pair of adjustment coincidant elements and means including said secondary reflectors for projecting while ranging and through at least the exact optical equivalent of all of said aligning, directing and deviating system, light from at least one of the elements into focus forming an image of said one element adjacent to at least an image of the other element and for deviating said element image relative to said at least an image of the other element.

17. A coincidence range finder of the type having two spaced viewing points at which substantially collimated beams of light are received from the object being ranged, an optical system for aligning the two object light beams, for directing them toward a comparison plane and for deviating one beam relative to the other, said range finder being characterized by a scale and index constituting a pair of adjustment coindicant elements and means for projecting through at least the exact optical equivalent of all of said optical aligning, directing and deviating system, light from at least one of the elements into focus forming an image of said one element adjacent to at least an image of the other element and for deviating said element image relative to said at least an image of the other element.

18. A range finder according to claim 17 in which said elements are rigidly attached to one another.

19. A range finder according to claim 17 in which said elements are at least optically in the comparison plane.

20. A range finder according to claim 17 in which said elements are in the comparison plane.

21. A range finder according to claim 17 in which an eyepiece is included for viewing the comparison plane and at least images of said scale and index are visible through said eyepiece.

22. A range finder according to claim 17 in which is included a transparent element having a flat surface and both of said elements are on said surface.

23. A range finder according to claim 17 in which said elements are in said field and at the margin thereof.

24. A range finder according to claim 17 in which said comparison plane intersects a surface having a reflecting area adjacent to a transmitting area and in which said one of the elements consists of a transparent marking in said reflecting area.

25. A range finder according to claim 17 in which said comparison plane is approximately symmetrically located between the two viewing points and in which said optical system includes a main reflector at each viewing point directing the beams toward the center of the finder and said projecting means includes an auxiliary reflector in front of each of said main reflectors, oriented to reflect light from the adjacent main reflector toward the other auxiliary reflector.

26. A coincidence range finder of the type having a housing with two spaced windows in the front thereof at which substantially collimated beams of light are received from the object being ranged, an optical system including a reflector behind each window for receiving light beams through the windows and for directing them into alignment toward a comparison field, at least one objective for focusing the two beams in said field and light deviating means for adjusting one beam relative to the other, said range finder being characterized by a pair of adjustment coindicant elements rigidly attached to one another and means including at least the exact optical equivalent of all of said alignment directing system and including reflecting means permanently located at points in front of each of said reflectors for reflecting light from one window vicinity to the other, for projecting adjacent to one element an image of the other element, said element image also being deviated by the light deviating means.

27. A coincidence range finder of the type having a housing with two spaced windows in the front thereof, an optical system including a reflector behind each window and at least one objective for forming in a single comparison field two images of the object being ranged, means for viewing the images from outside the housing and light deviating means for adjusting one image relative to the other to bring them into coincidence, said range finder being characterized by auxiliary reflecting means permanently located at points substantially in the path of the object beams at each viewing point for reflecting light from one window vicinity to the other and two adjustment coindicant elements at least optically in the comparison field, one element being viewable substantially directly, light from the other element being collimated by one objective of the system, being reflected by said auxiliary reflecting means and being focused adjacent to said one element by one objective of the system, said light from the other element also being deviated by the light deviating means, whereby any change in the optical system or light deviating means which affects the relative position of the two object images equally affects the relative position of said one element and said other element image.

28. A range finder of the symmetrical coincidence type having a housing with two spaced windows in the front thereof, means for defining a comparison field centrally located in the housing, means for viewing the field from outside the housing, reflecting surfaces in the housing for reflecting light from each window into the comparison field, objectives of equal focal length axially between the field and each window at their focal distances from the field for focusing in the field two images of the object being ranged and light deviating means for adjusting one image relative to the other to bring them into coincidence, said range finder being characterized by a scale and index integrally attached to one another, both at least optically in the comparison field and constituting adjustment coindicant elements one of which is visible substantially directly, light from the other element being directed to one objective and collimated thereby, an auxiliary reflector in the vicinity of each of the two windows for receiving this collimated light, for reflecting it from one window vicinity to the other and for directing it through the other objective whereby it is brought to focus forming an image of said other element adjacent to said one element, said light also being deviated by the light deviating means.

29. A range finder according to claim 26 and of the split field type in which the field intersects at an angle a flat surface part of which is reflecting to reflect one of the object beams and the rest of which is transmitting to transmit the other object beam, said one element being a transmitting mark in said reflecting part and the other element being marked on said transmitting part and in which means are included for sending light to and through said one element only in the direction from which the object beam arrives at said reflecting part.

30. A range finder according to claim 28 in which are included crossed reflecting surfaces for receiving the two beams from the reflectors behind the windows and for reflecting them parallel to one another, a right angle prism in the lower of the two beams for reflecting it up and another right angle prism in the upper beam for reflecting it down, the surface between the two prisms being partly reflecting and partly transmitting and the comparison field intersecting the latter surface at an angle to be viewed through the hypotenuse of one of the right angle prisms and in which said one element is in said surface and is illuminated through the hypotenuse face of the other right angle prism.

31. A coincidence range finder of the ortho-psuedo-stereo type having two comparison planes and means for receiving at spaced viewing points, beams from the object being ranged for forming in each plane right and left viewing point images adjacent to one another and light deviating means for deviating one image relative to the other, said range finder being characterized by a pair of adjustment coindicant elements attached to one another and means, including auxiliary reflecting means permanently located at points substantially in the paths of the object beams at each viewing point at least the optical equivalent of all of said image forming means, for projecting while ranging, and from one of the elements, light into focus forming on image adjacent to at least an image of the other element.

32. A coincidence range finder of the ortho-pseudo-stereo type having two comparison planes and means for receiving at spaced viewing points, beams from the object being ranged and for forming in each plane right and left viewing point images adjacent to one another and light deviating means for deviating one image relative to the other, said range finder being characterized by a scale and an index rigidly attached to one another, at least optically in one of the comparison planes and constituting adjustment coindicant elements and means, for projecting adjacent to one of the elements an image of the other element while ranging, said projecting means including the optical equivalent of all of said means for forming images in said one of the planes and reflecting means permanently located at points substantially in the path of the object beams at each viewing point for reflecting light from one viewing point to the other.

JOSEPH MIHALYI.